(12) United States Patent
Blank et al.

(10) Patent No.: US 12,498,084 B2
(45) Date of Patent: Dec. 16, 2025

(54) WALL-MOUNTABLE BRACKET FOR A PUMP ACTION DISPENSER

(71) Applicant: Producto Pty Ltd, Victoria (AU)

(72) Inventors: Samuel Clifford John Blank, Victoria (AU); Kyn San Lau, Victoria (AU); Raymond Par, Victoria (AU)

(73) Assignee: Producto Pty Ltd, Victoria (AU)

( * ) Notice: Subject to any disclaimer, the term of this patent is extended or adjusted under 35 U.S.C. 154(b) by 0 days.

(21) Appl. No.: 18/649,441

(22) Filed: Apr. 29, 2024

(65) Prior Publication Data

US 2025/0334224 A1    Oct. 30, 2025

(51) Int. Cl.
*F16M 13/02* (2006.01)

(52) U.S. Cl.
CPC .................................. *F16M 13/02* (2013.01)

(58) Field of Classification Search
CPC .............................. F16M 13/02; A47K 5/1205
USPC ........................................................ 248/200
See application file for complete search history.

(56) References Cited

U.S. PATENT DOCUMENTS

| | | | |
|---|---|---|---|
| 10,342,391 B2 * | 7/2019 | Beckerman | B05B 11/0054 |
| 12,070,168 B2 * | 8/2024 | Runius | A47K 5/12 |
| 2023/0346171 A1 * | 11/2023 | Runius | F16M 13/02 |
| 2024/0099519 A1 * | 3/2024 | Runius | F16M 13/02 |

* cited by examiner

*Primary Examiner* — Todd M Epps
(74) *Attorney, Agent, or Firm* — Fleit Intellectual Property Law; Paul D. Bianco

(57) ABSTRACT

A wall-mountable bracket for mounting a pump action dispenser has an upright member, a basal support projecting outwardly from a lower end of the upright member, a tab projecting outwardly from an upper end of the upright member, above the basal support, and a retainer member adjustably mounted on and projecting outwardly from the tab above the basal support. The retainer member is adapted for engaging the pump action dispenser supported on the basal support in an upright position adjacent the upright member, and adjustable to releasably secure the pump action dispenser.

20 Claims, 10 Drawing Sheets

WALL-MOUNTABLE BRACKET FOR A PUMP ACTION DISPENSER

FIELD OF THE INVENTION

This invention relates to a wall-mountable bracket of the type suitable for holding a pump dispenser having a container for a liquid to be dispensed and a closure fitted with a pump action dispensing nozzle. Pump dispensers are frequently installed in bathrooms, such as in a shower recess, as cosmetic dispensers, for dispensing from the container a small quantity of a liquid, such as shampoo, conditioner or a bodywash. When so installed, the dispensers frequently are secured in an upright in-use orientation in a suitable wall-mountable bracket.

BACKGROUND OF THE INVENTION

Any discussion of documents, devices, acts or knowledge in this specification is included to explain the context of the invention. It should not be taken as an admission that any of the material forms a part of the prior art base or the common general knowledge in the relevant art in the United States of America, or elsewhere, on or before the priority date of the disclosure herein.

Wall-mounted pump dispensers commonly are provided in guest accommodation such as provided in hotels and motels. Usually, the dispensers have a container able to hold a sufficient volume of a liquid to enable numerous repeated uses without the need to replenish the liquid. However, this increases the likelihood of unauthorised removal of the dispenser and, for a dispenser used by successive guests in a hotel or motel, the risk of a guest using liquid contaminated by a previous user.

The present invention seeks to provide an improved or alternative form of a wall-mountable bracket for holding a pump dispenser having a container for a liquid to be dispensed, and a closure fitted with a pump action dispensing nozzle.

SUMMARY OF THE INVENTION

Accordingly, in one aspect, the present invention, provides a wall-mountable bracket suitable for holding in an upright in-use orientation a pump dispenser having a container and a closure, wherein, relative to that orientation, the wall-mountable bracket has: an upright member adjacent which the container of the pump dispenser can be positioned with the upright member mounted against a wall; a basal support for the pump dispenser projecting outwardly from a lower end of the upright member for supporting the pump dispenser adjacent the upright member, the basal support configured for engaging with the pump dispenser when supported thereon; a tab projecting outwardly from an upper end of the upright member, above the basal support; and, a retainer member adjustably mounted on and projecting outwardly from the tab above the basal support, the retainer member adapted for engaging the pump dispenser at or adjacent to the closure to releasably secure the pump dispenser adjacent to the upright member and engaged with, and supported by, the basal support.

Preferably, the basal support or the tab, or each of the basal support and the tab, may be made separately from, and secured to, the upright member. In a practical preferred embodiment, the upright member, the basal support and the tab are formed integrally, such as from a suitable metal or plastics material of sufficient rigidity that unintended removal of the pump dispenser is strongly resisted.

Preferably, the pump dispenser may have a cylindrical container or at least a container of circular form in horizontal cross-sections. However, the container may be of other forms in horizontal cross-sectional, such as square or other rectangular form. In each case, the basal support may have a peripheral form that is complementary to the form of a periphery of a base of the container. In one arrangement in which the basal support has such a peripheral form, the basal support may be at least partially complementary to the base of the container, such as by having at least one upstanding peripheral edge portion of the basal support that constrains the container against lateral displacement from the basal support. In that one preferred arrangement, the basal support may have a continuous or discontinuous upstanding peripheral wall that so constrains the container. Alternatively, for a container having an upwardly recessed base, the basal support may have at least one upstanding portion that is locatable in, and may be complementary to, a recess of the container base, to thereby constrain the container against lateral displacement from the basal support.

Preferably, the retainer member is adjustably mounted on and projects outwardly from the tab above the basal support. In being adapted for engaging the pump dispenser, at or adjacent to the closure of the pump dispenser, to releasably secure the pump dispenser as detailed above, the retainer member may extend outwardly from the tab, away from the upper end of the upright member. In so extending, the retainer member may have a first end, of first and second opposite ends, adjacent which the retainer member is adjustably engaged with the tab. At the second end, the retainer member is adapted for engagement with the pump dispenser, at or adjacent to the closure. In one form, the retainer member is so adapted by being configured at the second end for extending substantially circumferentially with respect to the closure. The retainer member may be configured at the second end to extend substantially circumferentially with respect to a skirt of the closure. Alternatively, with a pump dispenser in which an upper end of a tubular housing of a one-way valve of the pump dispenser projects through a top wall of the closure, the retainer member may be configured at the second end to extend substantially circumferentially with respect to the upper end of the tubular housing, adjacent to the top wall of the closure. In each case, the arrangement may be such that the pump dispenser can be secured adjacent to the upright member, and engaged with and supported by the basal support, with this preferably being by the retainer member being configured at the second end to define an annular loop for encircling the skirt of the closure or the upper end of the tubular housing, respectively.

Preferably, the first end of the retainer member may be engaged with the tab in a manner that enables the retainer member to pivot or swing relative to the upright member and the tab. The retainer member preferably can pivot or swing to move the configured second end of the retainer member between a first position in which the configured end is engageable with the pump dispenser and a second position in which the configured end is out of engagement with, and preferably also spaced from, the pump dispenser. The retainer member may so pivot or swing relative to the tab about a horizontally extending axis. In one preferred arrangement, the retainer member has a main part of its length that is supported on or adjacent to an upper surface of the tab and extends beyond the tab away from the upright member, with the first end of the retainer member defined by a minor part of the length of the retainer member that extends through an opening defined by the tab. The minor part of the length of the retainer member may curve from the main part to extend through the opening of the tab, while the minor part may curve oppositely to the first end of the retainer member, such that the minor part is somewhat S-shape with the first end opposite the upright member.

Preferably, the first end of the retainer member may be engaged with the tab in a manner that enables the retainer member to pivot or swing relative to the upright member to move the configured second end of the retainer member between first and second positions. In arrangements enabling this, the retainer member may be releasably retainable with the second end in the first position for engaging the pump dispenser. The wall-mountable bracket may include a detent device in the form of a catch or a lever that releasably locks the retainer member for retaining the configured end of the retainer member in the first position, in which the configured end is engageable with the pump dispenser. In an alternative arrangement, the wall-mountable bracket and the retainer member may be releasably retainable with the second end in the first position by means of a key-operable locking device that secures the retainer member relative to the tab with the configured end of the retainer member in the first position. In one form of the alternative arrangement, the key operable locking device comprises a lock barrel that, with the second end the retainer member in the first position, is receivable through in-line openings defined by the retainer member and the tab. The lock barrel may have a peripheral rim at one end that bears against, or is recessed into, the retainer member while the barrel is adapted at its other end to provide a camming action against to tab, such as after a predetermined turn of the lock barrel. The opening through the tab may be configured to enable such camming action in co-operating with at least one integral cam formation of the lock barrel.

Preferably, more than one of the wall-mountable brackets can be deployed as a set by way of one or more crossmember(s) for affixing the one or more wall-mountable brackets on a wall at predetermined spacings.

These and other essential or preferred features of the present invention will be apparent from the description that now follows.

BRIEF DESCRIPTION OF THE DRAWINGS

In order that the invention may be more clearly understood and put into practical effect there shall now be described in detail a preferred wall-mountable bracket for a pump action dispenser made in accordance with a preferred embodiment of the present invention. The ensuing description is given by way of non-limitative examples only and is with reference to the accompanying drawings, wherein.

MODES FOR CARRYING OUT THE INVENTION

Figure 1:
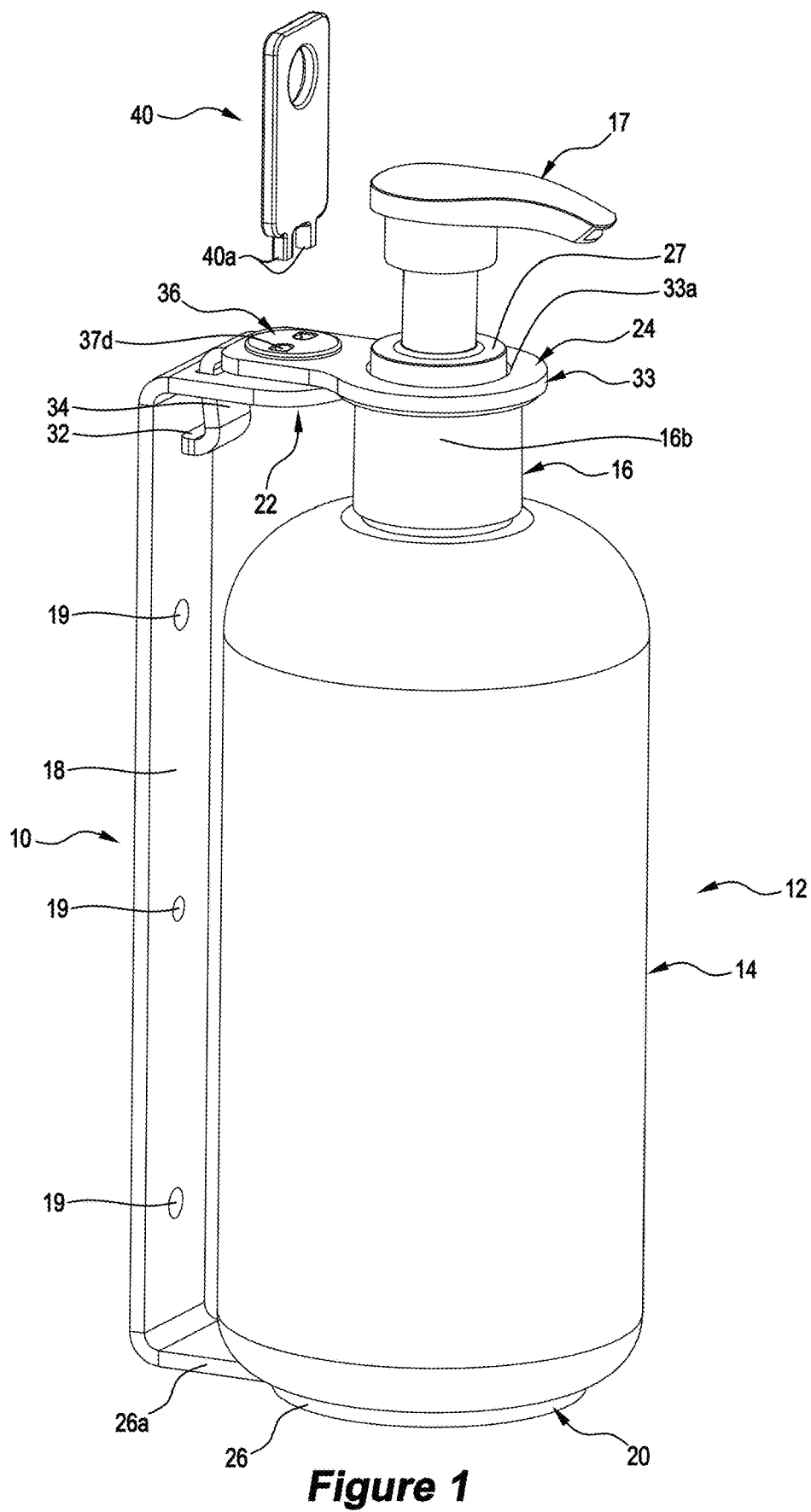
FIG. 1 is a front perspective view of a wall-mountable bracket shown in combination with a pump dispenser held by the bracket in an upright in-use orientation for the bracket and the pump dispenser, and a preferred embodiment of a key for selectively locking and unlocking the pump dispenser relative to the bracket, made in accordance with a preferred embodiment of the present invention.

In the following detailed description of the invention, reference is made to the drawings in which like reference numerals refer to like elements throughout, and which are intended to show by way of illustration specific embodiments in which the invention may be practiced. It is to be understood that other embodiments may be utilised and that procedural and/or structural changes may be made without departing from the spirit and scope of the invention.

Figure 16:
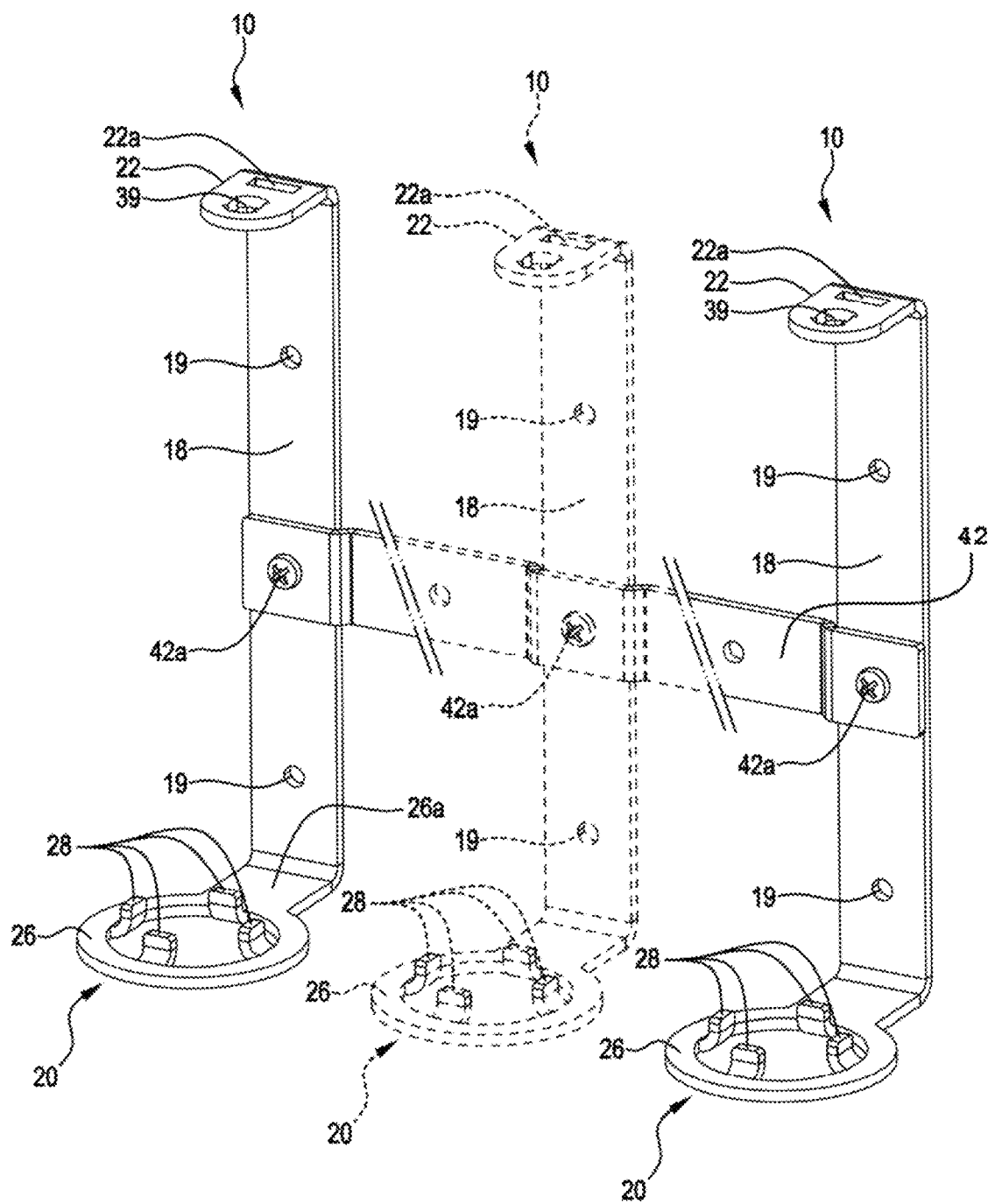
FIG. 16 shows a partial arrangement for installation of multiple wall-mountable brackets, each as shown in FIG. 1, for presenting a side-by-side selection of pump dispensers.

With reference to FIGS. 1 to 7, there is shown a wall-mountable bracket 10 suitable, as shown, for holding in an upright in-use orientation a pump dispenser 12 (hereinafter simply referred to as "dispenser 12") that has a container 14, a closure 16 and a pump-action nozzle 17. The bracket 10 has an upright member 18 having longitudinally spaced securement holes 19 by which the bracket 10 can be securely mounted against a wall (not shown) by suitable fasteners (also not shown in FIGS. 1 to 7, but which may be rivets 42a, or the likes, as shown in FIG. 16). The bracket 10 further includes a basal support 20 on which the dispenser 12 can be supported adjacent the upright member 18, with the basal support 20 projecting outwardly from a lower end of the upright member 18. Additionally, the bracket 10 includes a tab 22 projecting outwardly from an upper end of the upright member 18, above the basal support 20 and a retainer member 24 that is adjustably mounted on and projects outwardly from the tab 22, above the basal support 20. The retainer member 24 is adapted for engaging the dispenser 12 at or adjacent to the closure 16 to releasably secure the dispenser 12 adjacent to the upright member 18 and engaged on, and supported by, the basal support 20. The arrangement is such that the dispenser 12 can be positioned as convenient for dispensing contents (not shown) of the container 14.

Figure 2:
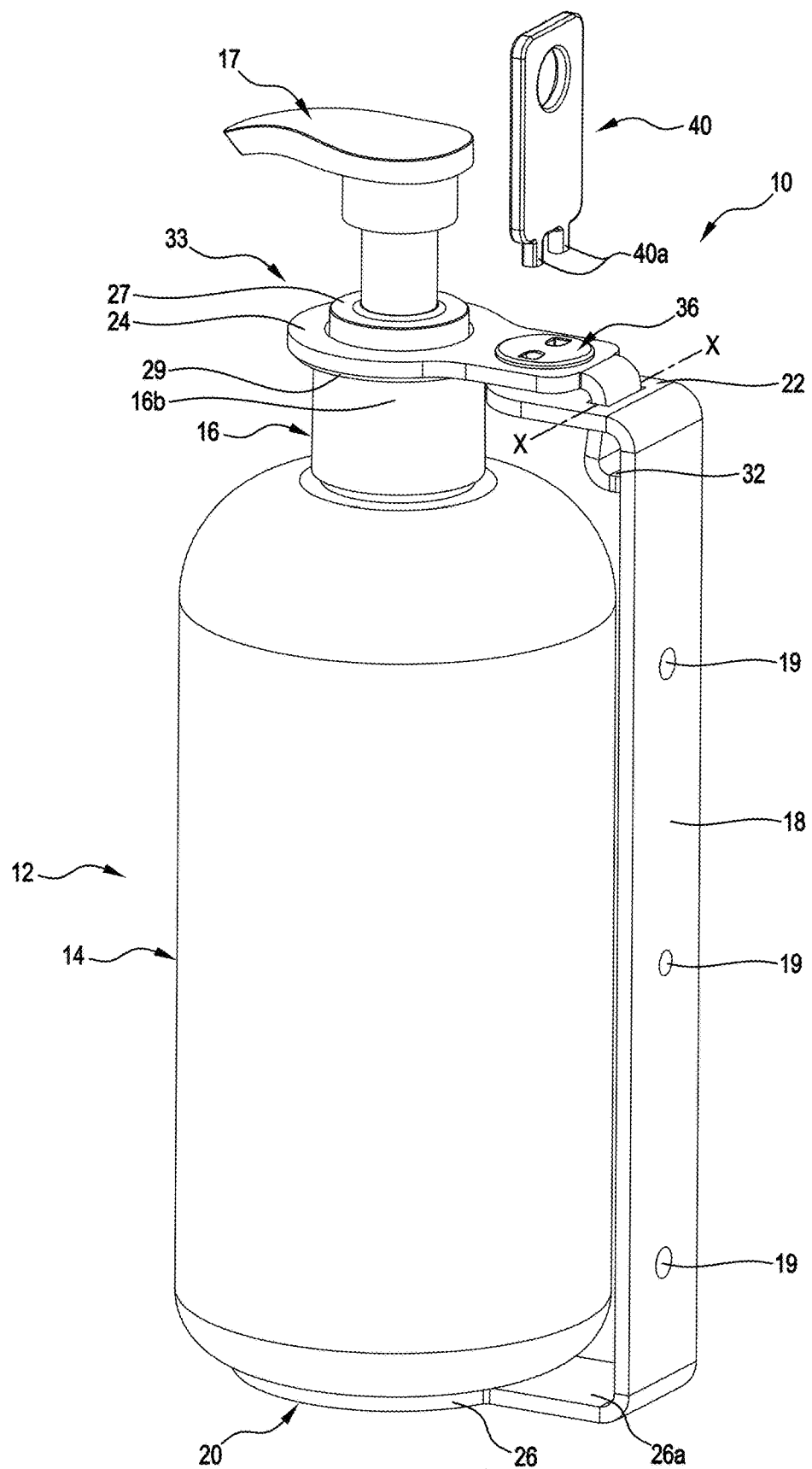
FIG. 2 is a rear perspective view of the bracket and pump dispenser shown in FIG. 1.
Figure 3:
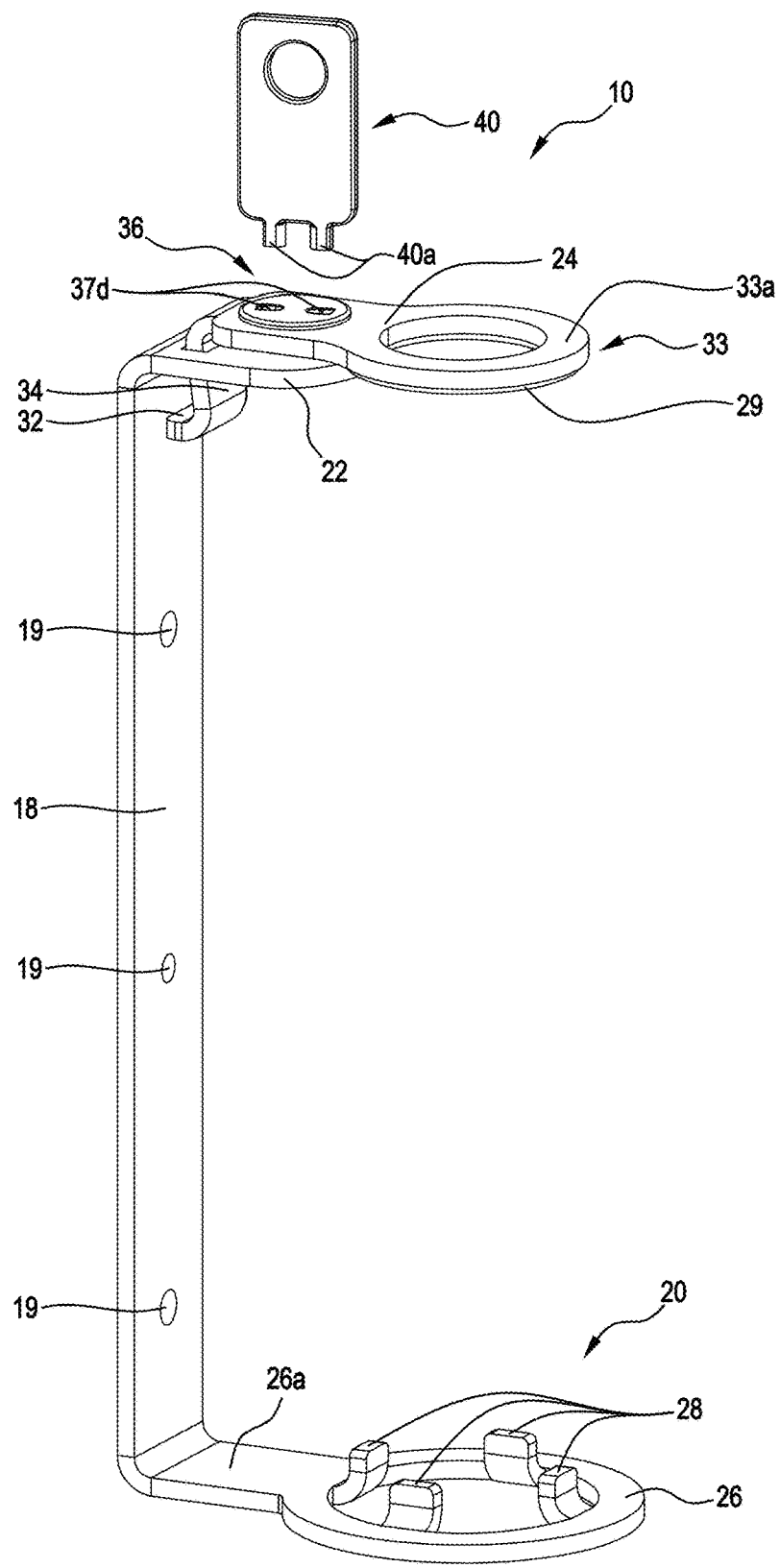
FIG. 3 shows the bracket of FIG. 1 without the pump dispenser.
Figure 4:
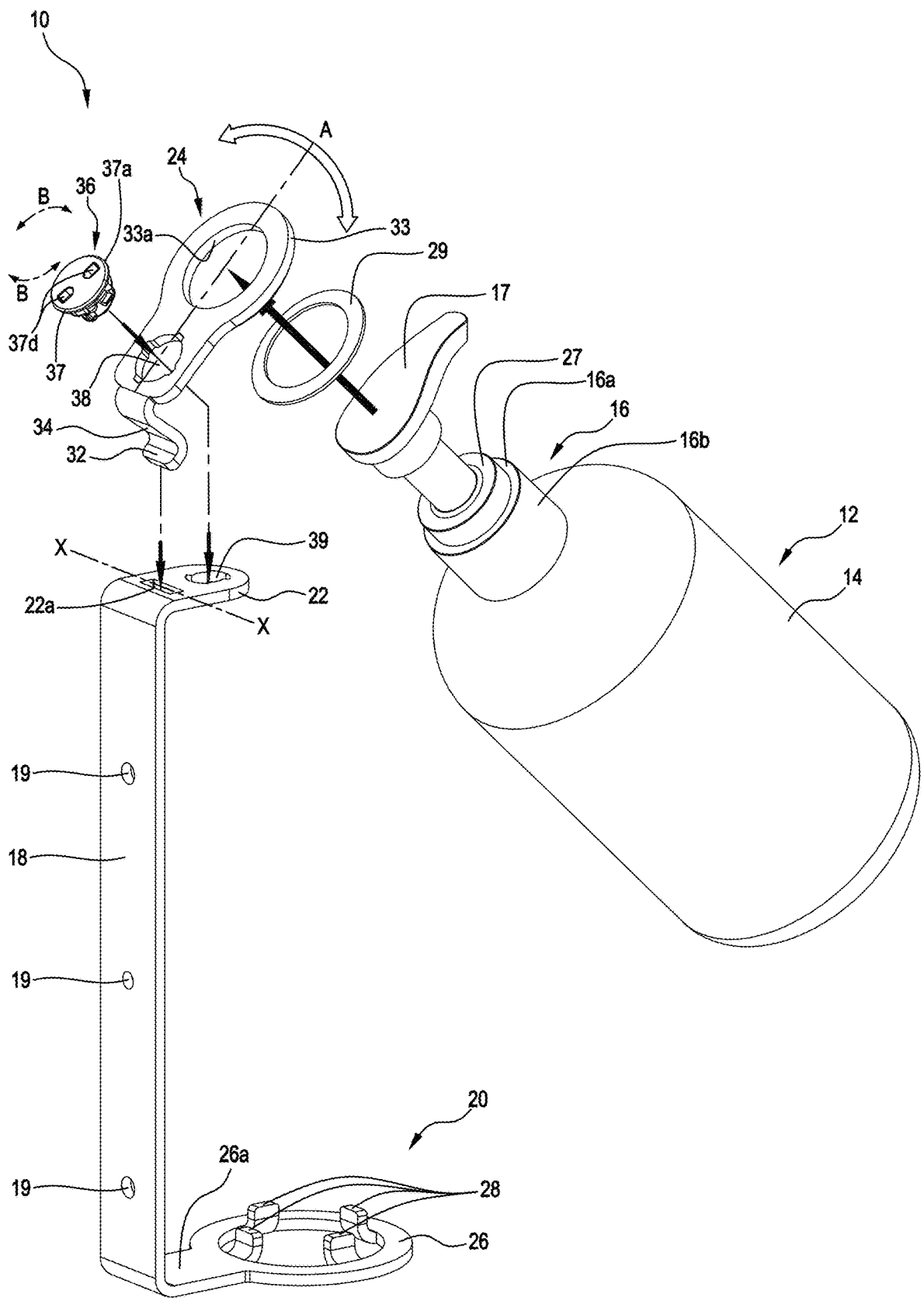
FIG. 4 is a rear perspective exploded view of the bracket and the pump dispenser of FIG. 1, excluding the preferred key, with the bracket in a condition for receiving the pump dispenser being presented thereto.
Figure 7:
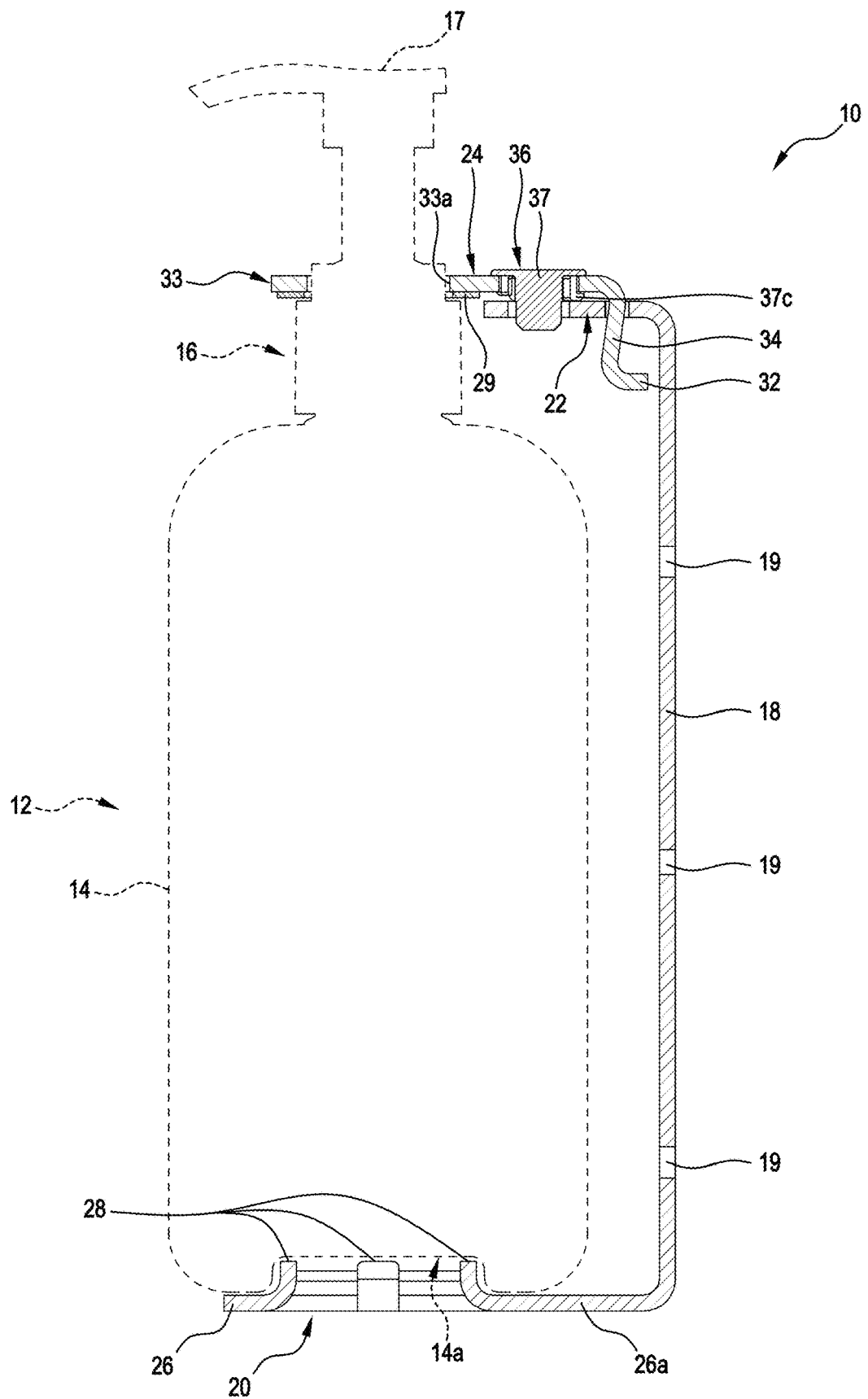
FIG. 7 is a sectional view taken on line 7-7 of FIG. 6, with the pump dispenser depicted in broken line.

The basal support 20 is configured for engaging with the container 14 of the dispenser 12. As shown in FIGS. 1 to 6, the container 14 is preferably of circular cylindrical form but, as shown in FIG. 7, the container 14 preferably has a recessed base 14a. The basal support 20 has an annular portion 26 on which the dispenser 12 is supported and a bridge portion 26a by which annular portion 26 is connected to the lower end of upright member 18. As seen in FIGS. 3, 4 and 7, around the inner periphery of annular portion 26, the basal support 20 preferably has a plurality of circumferentially spaced upstanding fingers 28. With the dispenser 12 supported on annular portion 26 of basal support 20, the fingers 28 locate the preferred recessed base 14a of container 14 and thereby constrain the dispenser 12 from unintentionally moving out of engagement with basal support 20. Although not shown in the figures, a similar arrangement is possible with a dispenser 12 having a container 14 other than of circular cylindrical form, for example rectangular, such as square, cylindrical form. Accordingly, the present invention as described herein should not be construed as limited to the specific dispenser 12 shown in the figures.

The basal support 20 or the tab 22, or each of the basal support 20 and the tab 22, may be made separately from, and secured to, the upright member 18. Preferably, the bracket 10 comprises an upright member 18, a basal support 20, and a tab 22 that are formed integrally. In an integral form, the bracket 10 preferably is formed from a suitable metal, such as steel or an aluminium alloy. However, alternatively, the integral bracket 10 can be made of a plastics material, such as an engineering plastics material, of sufficient rigidity that secure mounting can be achieved, with unintended removal of the dispenser 12 strongly resisted.

As shown, the retainer member 24 is adjustably mounted on and projects outwardly from the tab 22 above the basal support 20. The retainer member 24 is engageable with the dispenser 12, at or adjacent to the closure 16 of the dispenser 12, to releasably secure the dispenser 12 on the basal support 20 and adjacent the upright member 18. The retainer member 24 extends outwardly from the tab 22, away from the upper end of the upright member 18. The retainer member 24 has a first end 32, of first and second opposite ends 32 and 33, with the retainer member 24 being adjustably engageable with the tab 22 adjacent the first end 32. At the second end 33, the retainer member 24 is adapted for engagement with the dispenser 12, at or adjacent to the closure 16. For this, the retainer member 24 is preferably configured at the second end 33 for extending substantially circumferentially with respect to the closure 16, by the second end 33 defining, for example, a loop 33a (as shown) able to secure the dispenser 12 by engaging at or adjacent the closure 16. In the preferred arrangement shown, a tubular housing 27 of a one-way valve (not shown) of the dispenser 12 projects through a top wall 16a (see FIG. 4) of the closure 16, and preferred loop 33a extends circumferentially around the housing upper end 27, against a preferred washer 29 (best seen in FIG. 4) supported on the top wall 16a, around the projecting end of housing 27. However, alternatively, the preferred loop 33a may fit neatly over the closure 16 to extend substantially circumferentially around a skirt 16b of the closure 16. In each case, the dispenser 12 is securable adjacent to the upright member 18 and engaged with and supported by the basal support 20. In use, washer 29 is preferably adhered to the underside surface of retainer member 24 by glue or other adhesive. Whilst a preferred loop 33a at the second end 33 of retainer member 24 is shown and described, it will be appreciated that a broken loop 33a (not shown), such as for example a somewhat C-shaped arrangement, may also achieve a similar arrangement for retaining dispenser 12 relative to closure 16. Accordingly, the present invention should not be construed as limited to the specific arrangement as shown and described.

The first end 32 of the retainer member 24 is engaged with the tab 22 in a way enabling the retainer member 24 to pivot or swing relative to the upright member 18 and the tab 22. The retainer member 24 can pivot or swing adjacent the first end 32, about a horizontally extending axis X-X (see FIGS. 2, 4 and 8), to move the configured second end 33 of the retainer member 24 between a first position shown in FIGS. 1 to 3 and 5 to 7, in which the configured second end 33 is engaged with the dispenser 12, and a second position shown in FIG. 4 (albeit in an exploded view). In the position evident from FIG. 4, the configured second end 33 is out of engagement with, and spaced above, the dispenser 12. When in the first position shown in FIGS. 1 to 3 and 5 to 7, the retainer member 24 has a main part of its length supported on or adjacent an upper surface of the tab 22 and extends beyond the tab 22 away from the upright member 18, with the first end 32 of the retainer member 24 defined by a minor part 34 of the length of the retainer member 24 that depends through a slot opening 22a that is defined by and extends horizontally across the tab 22. The minor part 34 of the length of the retainer member 24 curves from the main part to extend through the slot opening 22a of the tab 22, with the minor part 34 oppositely curved to the first end 32 of the retainer member 24 in a somewhat S-shape form with the first end 32 adjacent to the upright member 18. Whilst a preferred somewhat S-shape form of the first end 32 of retainer member 24 is shown and described, it will be appreciated that other arrangements are also possible, such as, for example, a somewhat C-shape or a somewhat Z-shape form (both alternative arrangements not being shown). Accordingly, the present invention should not be construed as being limited to the specific example as shown and described.

Figure 5:
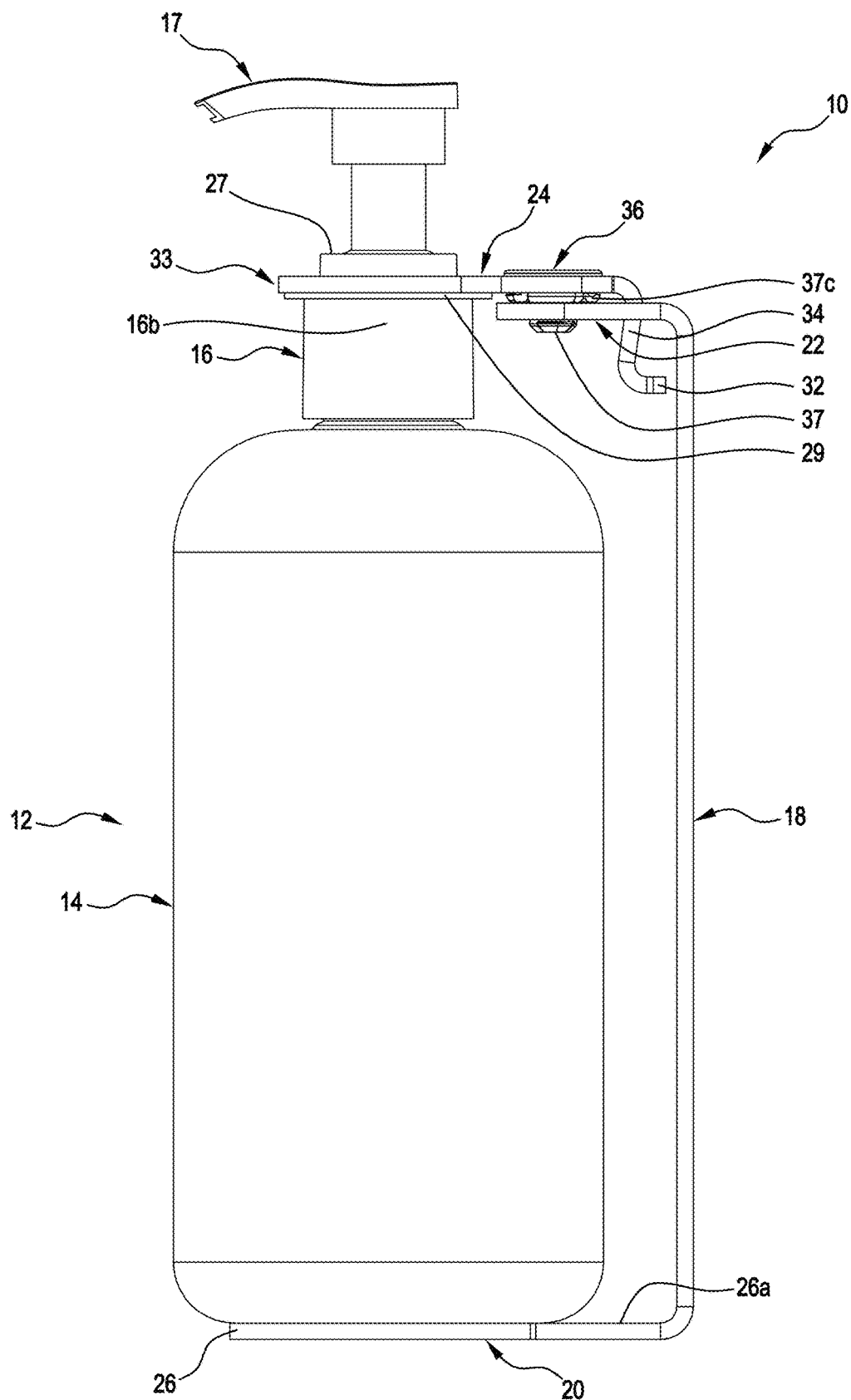
FIG. 5 is a side elevation of the arrangement of FIG. 1, excluding the preferred key.
Figure 6:
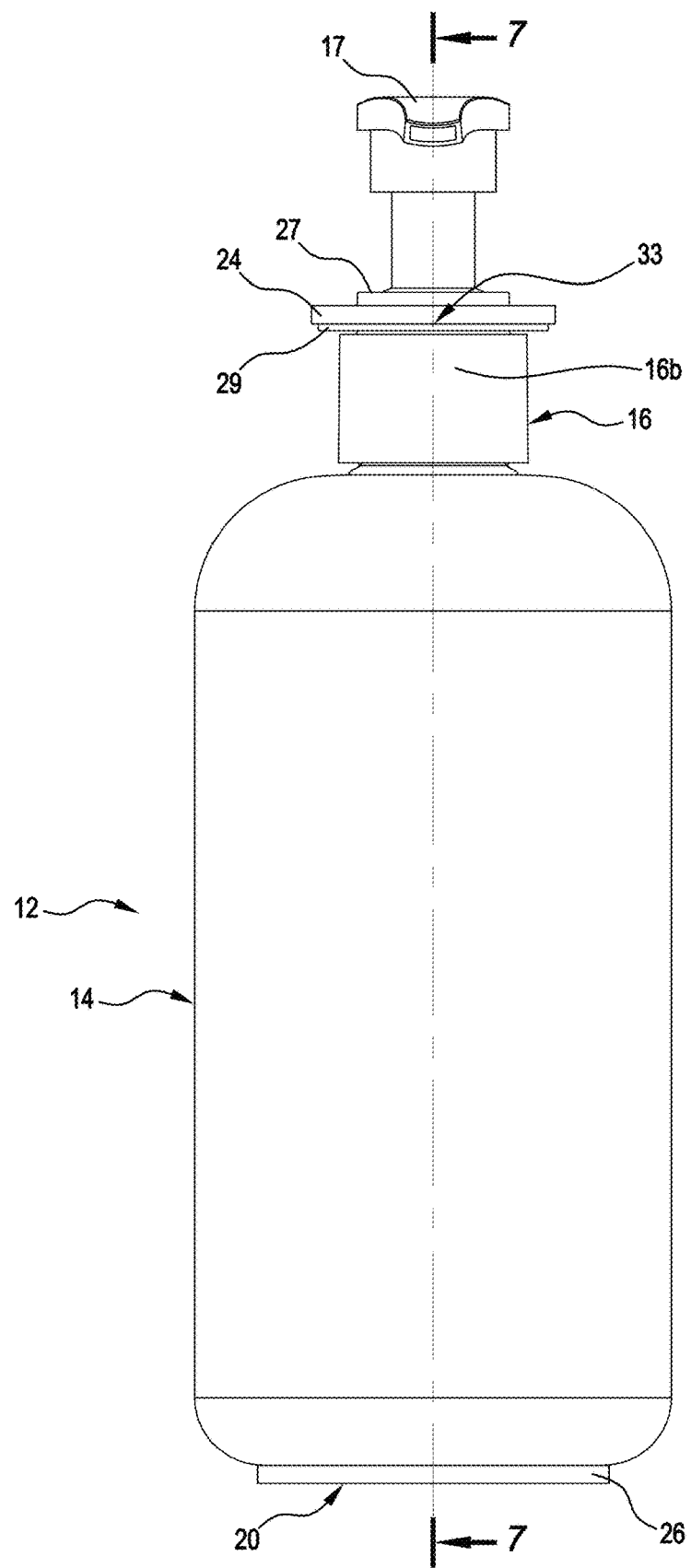
FIG. 6 is a front elevation of the arrangement of FIG. 1, excluding the preferred key.
Figure 9:
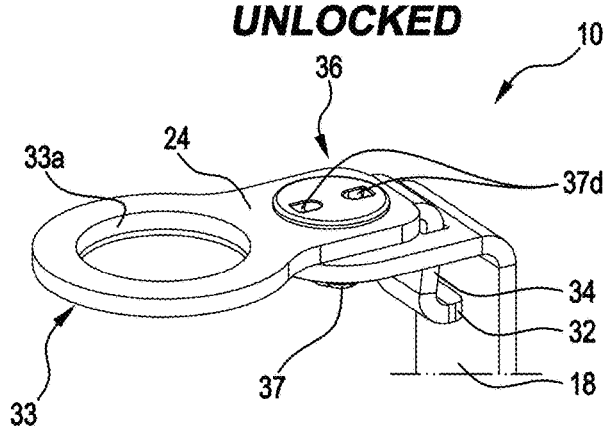
FIG. 9 depicts the components shown in FIG. 8 in an assembled unlocked condition.
Figure 8:
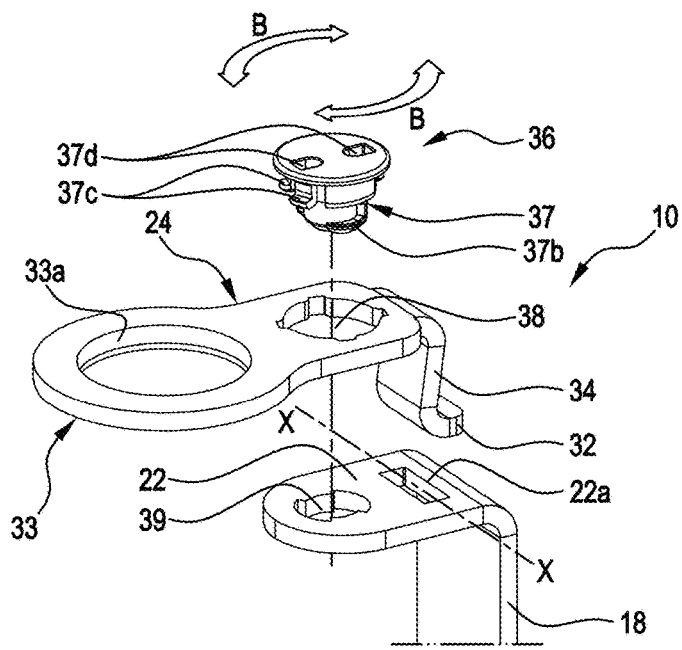
FIG. 8 is an exploded view of components of the bracket of FIG. 1, excluding the preferred key.
Figure 10:
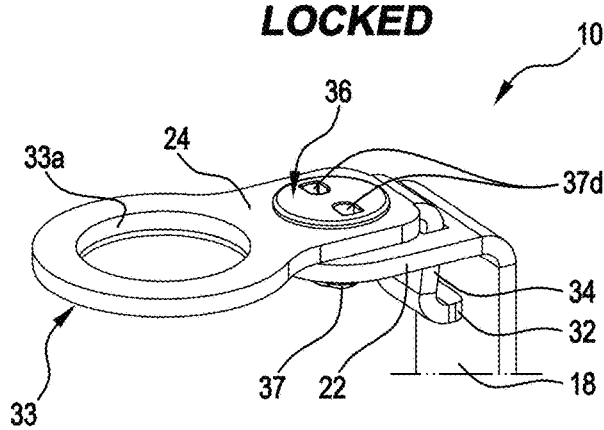
FIG. 10 corresponds to FIG. 9, but with the components in an assembled locked condition.
Figure 11:
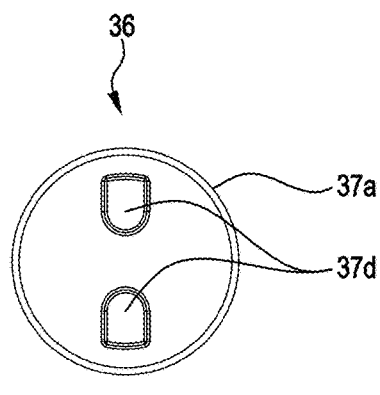
FIG. 11 is a top plan view of one of the components shown in FIG. 8.
Figure 14:
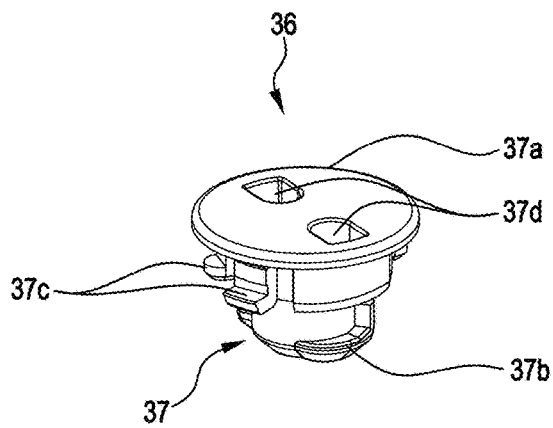
FIG. 14 is a top perspective view of the one component shown in FIG. 11.
Figure 12:
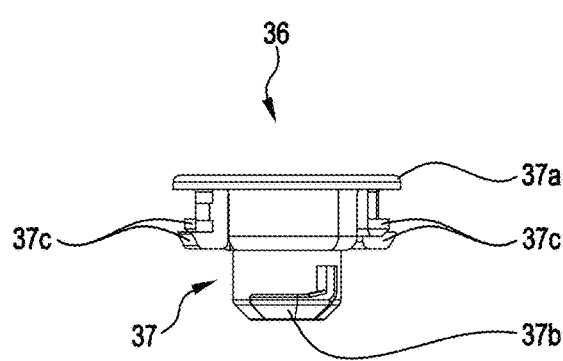
FIG. 12 is a side elevation of the one component shown in FIG. 11.
Figure 15:
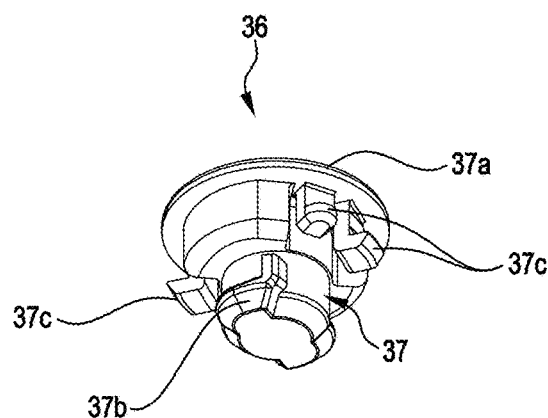
FIG. 15 is an underside perspective of the one component shown in FIG. 11.
Figure 13:
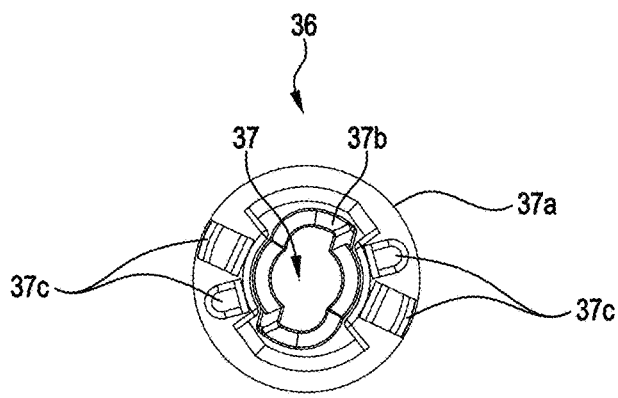
FIG. 13 is an underside view of the one component shown in FIG. 11.

As indicated, the retainer member 24 is engaged with the tab 22 in a manner that enables the retainer member 24 to pivot or swing (as indicated by arrows A in FIG. 4) relative to the tab 22 and the upright member 18 to move the configured second end 33 of the retainer member 24 between first and second positions. The retainer member 24 is releasably retainable with the second end 33 in the first position for engaging the dispenser 12. For this, the wall-mountable bracket 10 includes a detent device comprising in the form of a preferred key-operable locking device 36 that, as shown in FIGS. 8 to 10, is operable to secure the retainer member 24 relative to the tab 22, with the configured second end 33 of the retainer member 24 in the first position. The key operable locking device 36 comprises a lock barrel 37 that, with the second end 33 of the retainer member 24 in the first position, is receivable through in-line openings 38 and 39 respectively (see, for example, FIG. 4) defined by the retainer member 24 and the tab 22. The opening 38 is preferably generally circular while, as seen most clearly in FIGS. 11 to 15, lock barrel 37 is dimensioned to be receivable into opening 38 supported for rotation in opening 38 by a peripheral rim 37a at its upper end. The rim 37a is shown as bearing against the surface of retainer member 24, although the opening 38 may be recessed for receiving the rim 37a flush with that surface (not shown). The opening 39, of tab 22, is preferably elongate and shaped to receive the lower end of lock barrel 37 therethrough, with each of a lower diametrically opposed pair of projections 37b at the lower end of lock barrel 37 passing through opening 39 of tab 22. The lock barrel 37 then can be rotated through a predetermined turn, such as, for example, a preferred quarter turn (as indicated, for example, by arrows B in FIGS. 4 and 8), to locate each projection 37b under a respective longer side of opening 39, such as with the projections 37b providing a camming action against the lower surface of tab 22 and thereby gripping tab 22 between the lower projections 37b and an upper diametrically opposed set of projections 37c on the lock barrel 37. The arrangement being such that the set of projections 37c, of lock barrel 37, enables the retainer member 24 to be disposed parallel to tab 22, in the first position, with a small gap therebetween as best seen in FIGS. 5 and 7. As is shown in the figures, the lock barrel 37 is able to be rotated to lock the retainer member 24 in the first position, or to unlock the retainer member 24 to enable it to pivot or swing to the second position, by use of a key 40, as shown in FIGS. 1 to 3, of any suitable shape and/or configuration, and preferably having fingers 40a each engageable in a respective diametrically spaced recess 37d formed in the top of lock barrel 37, of locking device 36, such that, without access to the key 40, unauthorised unlocking of lock barrel 37 is hindered, reducing the risk of unauthorised removal of dispenser 12. Whilst preferred arrangements of locking device 36 are shown and described, it will be appreciated that other arrangements are possible, including multi-part locking devices 36 (not shown), and as such the present invention should not be construed as limited to the specific example as shown and described. Similarly, whilst preferred key 40 is shown and described as including preferred fingers 40a for engaging with preferred diametrically spaced recesses 37d of preferred locking device 36, it will be appreciated that other arrangements are possible, and as such, the present invention should not be construed as limited to the specific example as shown and described.

FIG. 16 shows a partial preferred arrangement for mounting a plurality of brackets 10 of the present invention in relation to a wall (not illustrated), using a preferred cross-member 42 that inter-fits with and is secured by a rivet 42a, or the like, to the respective upright member 18 of each bracket 10. The preferred cross-member 42 spaces the brackets 10 to facilitate easy access to each of the dispensers 12 for dispensing a required liquid. In FIG. 16, some components of brackets 10, including the retainer members 24 and locking devices 36, have been omitted for illustrative purposes only. Whilst a preferred cross-member 42 is shown and described, it will be appreciated that a plurality of brackets 10 of the present invention could likewise be mounted to a wall (not shown) without a cross-member 42, or by way of one or more alternative components (not shown).

With the retainer member 24 in the second position, a dispenser 12 can be presented at an angle to pass the pump-action nozzle 17 through the loop 33a defined by the second end 33 of retainer member 24. With the dispenser 12 adjusted to locate loop 33a around the projecting end of housing 27 and against the top wall 16a of closure 16, the dispenser 12 can be adjusted to an upright position in which it is engaged on basal support 20, as retainer member 24 is caused to pivot or swing on axis X-X to its first position. Lock barrel 37, or locking device 36, then can be inserted down through openings 38 and 39, and then rotated by key 40 to lock retainer member 24 in the first position, against tab 22.

While this invention has been described in connection with specific embodiments thereof, it will be understood that it is capable of further modification. The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the attached claims. Various modifications and equivalent arrangements are intended to be included within the spirit and scope of the invention. Therefore, the specific embodiments are to be understood to be illustrative of the many ways in which the principles of the present invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integers, steps, components to be grouped therewith.

The invention claimed is:

1. A wall-mountable bracket suitable for holding in an upright in-use orientation a pump dispenser having a container and a closure, wherein, relative to that orientation, the wall-mountable bracket has:
   an upright member adjacent which the container of the pump dispenser can be positioned with the upright member mounted against a wall;
   a basal support for the pump dispenser projecting outwardly from a lower end of the upright member for supporting the pump dispenser adjacent the upright member, the basal support configured for engaging with the pump dispenser when supported thereon;
   a tab projecting outwardly from an upper end of the upright member, above the basal support; and
   a retainer member adjustably mounted on and projecting outwardly from the tab above the basal support, the retainer member adapted for engaging the pump dispenser at or adjacent to the closure to releasably secure the pump dispenser adjacent to the upright member and engaged with, and supported by, the basal support,
   wherein the retainer member has a main part of its length that is supported on or adjacent to an upper surface of the tab and extends beyond the tab away from the upright member, with a first end of the retainer member defined by a minor part of the length of the retainer member that extends through an opening defined by the tab; and
   wherein the minor part of the length of the retainer member curves from the main part to extend through the opening of the tab, with the minor part curving oppositely to the first end of the retainer member, such that the minor part is somewhat S-shape with the first end opposite the upright member.

2. The wall-mountable bracket of claim 1, wherein the upright member, the basal support and the tab are formed integrally from a suitable metal or of a plastics material.

3. The wall-mountable bracket of claim 1, wherein more than one of the wall-mountable brackets can be deployed as a set by way of one or more cross-member(s) for affixing the one or more wall-mountable brackets on a wall at predetermined spacings.

4. The wall-mountable bracket of claim 1, for use with a pump dispenser having a container of circular form in horizontal cross-sections or of square or other rectangular form, wherein the basal support has a peripheral form that is complementary to the form of a periphery of a base of the container.

5. The wall-mountable bracket of claim 4, wherein the basal support is at least partially complementary to the base of the container by at least one upstanding peripheral edge portion of the basal support for constraining the container against lateral displacement from the basal support.

6. The wall-mountable bracket of claim 4, for a container having an upwardly recessed base, wherein the basal support has at least one upstanding portion that is locatable in, and optionally complementary to, the recessed base of the container to thereby constrain the container against lateral displacement from the basal support.

7. The wall-mountable bracket of claim 1, wherein a second end of the retainer member is adapted for engagement with the pump dispenser, at or adjacent to the closure.

8. The wall-mountable bracket of claim 7, wherein the retainer member is so adapted by being configured at the second end for extending substantially circumferentially with respect to the closure of the pump dispenser.

9. The wall-mountable bracket of claim 8, wherein the retainer member is configured at the second end to extend substantially circumferentially with respect to a skirt of the closure or, with a pump dispenser in which an upper end of a tubular housing of a one-way valve of the pump dispenser projects through a top wall of the closure, the retainer member is configured at the second end to extend substantially circumferentially with respect to the upper end or the tubular housing, adjacent to the top wall of the closure.

10. The wall-mountable bracket of claim 9, wherein the pump dispenser can be secured adjacent to the upright member, and engaged with and supported by the basal support, with this being by the retainer member being configured at the second end to define an annular loop for encircling the skirt of the closure or the upper end of the tubular housing, respectively.

11. The wall-mountable bracket of claim 1, wherein the first end of the retainer member is engaged with the tab in a manner that enables the retainer member to pivot or swing relative to the upright member and the tab.

12. The wall-mountable bracket of claim 11, wherein the retainer member can pivot or swing, about a horizontally extending axis to move a configured second end of the retainer member between a first position in which the configured end is engageable with the pump dispenser and a second position in which the configured end is out of engagement with, and also spaced from, the pump dispenser.

13. The wall-mountable bracket of claim 12, wherein the retainer member is releasably retainable with the second end in the first position for engaging the pump dispenser.

14. The wall-mountable bracket of claim 12, further including a detent device in the form of a catch or a lever, operable between the retainer member and the tab, that releasably locks the retainer member for retaining the configured end of the retainer member in the first position, in which the configured end is engageable with the pump dispenser.

15. The wall-mountable bracket of claim 12, wherein the retainer member is releasably retainable with the second end in the first position by means of a key-operable locking device that secures the retainer member relative to the tab with the configured end of the retainer member in the first position.

16. The wall-mountable bracket of claim 15, wherein the key-operable locking device comprises a lock barrel that, with the second end of the retainer member in the first position, is receivable through in-line openings defined by the retainer member and the tab with the lock barrel having a peripheral rim at one end that bears against, or is recessed into, the retainer member.

17. The wall-mountable bracket of claim 16, wherein the lock barrel is adapted at its other end to provide a camming action against to tab after a predetermined turn of the lock barrel, with the opening through the tab configured to enable such camming action in co-operating with at least one integral cam formation of the lock barrel.

18. A wall-mountable bracket suitable for holding in an upright in-use orientation a pump dispenser having a container and a closure, wherein, relative to that orientation, the wall-mountable bracket has:
an upright member adjacent which the container of the pump dispenser can be positioned with the upright member mounted against a wall;
a basal support for the pump dispenser projecting outwardly from a lower end of the upright member for supporting the pump dispenser adjacent the upright member, the basal support configured for engaging with the pump dispenser when supported thereon;
a tab projecting outwardly from an upper end of the upright member, above the basal support; and,
a retainer member adjustably mounted on and projecting outwardly from the tab above the basal support, the retainer member adapted for engaging the pump dispenser at or adjacent to the closure to releasably secure the pump dispenser adjacent to the upright member and engaged with, and supported by, the basal support;
wherein the retainer member is adapted for engaging the pump dispenser, at or adjacent to the closure of the pump dispenser, by having a first end adjacent which the retainer member is adjustably engaged with the tab, wherein the first end of the retainer member is engaged with the tab in a manner that enables the retainer member to pivot or swing relative to the upright member and the tab;
wherein the retainer member can pivot or swing, about a horizontally extending axis, to move a configured second end of the retainer member between a first position in which the configured end is engageable with the pump dispenser and a second position in which the configured end is out of engagement with, and also spaced from, the pump dispenser;
wherein the retainer member is releasably retainable with the second end in the first position by means of a key-operable locking device that secures the retainer member relative to the tab with the configured end of the retainer member in the first position; and,
wherein the key-operable locking device comprises a lock barrel that, with the second end of the retainer member in the first position, is receivable through in-line openings defined by the retainer member and the tab, with the lock barrel having a peripheral rim at one end that bears against, or is recessed into, the retainer member.

19. The wall-mountable bracket of claim 18, wherein the retainer member has a main part of its length that is supported on or adjacent to an upper surface of the tab and extends beyond the tab away from the upright member, with the first end of the retainer member defined by a minor part of the length of the retainer member that extends through an opening defined by the tab.

20. The wall-mountable bracket of claim 19, wherein the minor part of the length of the retainer member curves from the main part to extend through the opening of the tab, with the minor part curving oppositely to the first end of the retainer member, such that the minor part is somewhat S-shape with the first end opposite the upright member.

\* \* \* \* \*